United States Patent
Kawakami

(10) Patent No.: US 11,688,875 B2
(45) Date of Patent: Jun. 27, 2023

(54) CELL, CELL STACK DEVICE, MODULE AND MODULE-CONTAINING DEVICE

(71) Applicant: KYOCERA Corporation, Kyoto (JP)

(72) Inventor: Masashi Kawakami, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 405 days.

(21) Appl. No.: 16/850,044

(22) Filed: Apr. 16, 2020

(65) Prior Publication Data

US 2020/0243890 A1 Jul. 30, 2020

Related U.S. Application Data

(63) Continuation of application No. 15/328,082, filed as application No. PCT/JP2015/076920 on Sep. 24, 2015, now Pat. No. 10,756,378.

(30) Foreign Application Priority Data

Sep. 26, 2014 (JP) ................. 2014-196854

(51) Int. Cl.
*H01M 8/2428* (2016.01)
*H01M 8/2475* (2016.01)
(Continued)

(52) U.S. Cl.
CPC ....... *H01M 8/2428* (2016.02); *H01M 4/9033* (2013.01); *H01M 8/02* (2013.01);
(Continued)

(58) Field of Classification Search
None
See application file for complete search history.

(56) References Cited

U.S. PATENT DOCUMENTS

| | | | |
|---|---|---|---|
| 2006/0046117 A1* | 3/2006 | Suh | H01M 8/0258 429/457 |
| 2006/0093891 A1 | 5/2006 | Issacci et al. | |

(Continued)

FOREIGN PATENT DOCUMENTS

| | | |
|---|---|---|
| CN | 102449839 A | 5/2012 |
| JP | 2011134542 A | 7/2011 |

(Continued)

*Primary Examiner* — Zhongqing Wei
(74) *Attorney, Agent, or Firm* — Viering, Jentschura & Partner mbB

(57) ABSTRACT

A cell including: a body having a first end portion and a second end portion; a first electrode layer electrically connected to the body; a solid electrolyte layer located on the first electrode layer; and a second electrode layer located on the solid electrolyte layer, wherein the body includes a plurality of gas-flow passages passing through the body from the first end portion to the second end portion; and the plurality of gas-flow passages include: one or more center-shifted gas-flow passages that include: a central portion and a first end portion; wherein a center of the one or more center-shifted gas-flow passages at the central portion is laterally shifted from a center of the one or more center-shifted gas-flow passages at the first end portion and a diameter of the one or more center-shifted gas-flow passages gradually increases from the central portion to the first end portion.

7 Claims, 6 Drawing Sheets

(51) Int. Cl.
*H01M 8/1253* (2016.01)
*H01M 8/24* (2016.01)
*H01M 8/12* (2016.01)
*H01M 8/02* (2016.01)
*H01M 4/90* (2006.01)
*H01M 8/0217* (2016.01)
*H01M 8/124* (2016.01)

(52) U.S. Cl.
CPC ........... *H01M 8/0219* (2013.01); *H01M 8/12* (2013.01); *H01M 8/1253* (2013.01); *H01M 8/24* (2013.01); *H01M 8/2475* (2013.01); *H01M 2008/1293* (2013.01); *Y02E 60/50* (2013.01)

(56) References Cited

U.S. PATENT DOCUMENTS

| | | |
|---|---|---|
| 2012/0148940 A1 | 6/2012 | Kuehn et al. |
| 2014/0212786 A1* | 7/2014 | Iwasaki ............... H01M 8/1246 429/465 |

FOREIGN PATENT DOCUMENTS

| | | | |
|---|---|---|---|
| JP | 4853979 | B2 | 1/2012 |
| JP | 5455270 | B1 | 3/2014 |
| JP | 2014110087 | A * | 6/2014 |
| JP | 2014110087 | A | 6/2014 |

* cited by examiner

CELL, CELL STACK DEVICE, MODULE AND MODULE-CONTAINING DEVICE

RELATED APPLICATIONS

The present application is a continuation of U.S. patent application Ser. No. 15/328,082 filed on Jan. 23, 2017, which is a national stage entry according to 35 U.S.C. § 371 of PCT application No.: PCT/JP2015/076920 filed on Sep. 24, 2015, which claims priority from Japanese Application No.: 2014-196854 filed on Sep. 26, 2014, which are incorporated herein by reference in their entirety.

TECHNICAL FIELD

The present invention relates to a cell, a cell stack device, a module and a module-containing device.

BACKGROUND ART

In recent years, as sources of next-generation energy, various fuel cell devices have been proposed in which a cell stack device is housed in a housing container. The cell stack device is constituted of a plurality of solid oxide fuel cells (also referred to simply as "fuel cells" hereinafter), serving as cells, electrically connected to each other in series.

A fuel cell in such a fuel cell device includes a support body extending in a longitudinal direction, and gas-flow passages that pass through the support body in the longitudinal direction thereof are provided in the interior of the support body. These gas-flow passages have the same diameter throughout the longitudinal direction (Patent Document 1).

CITATION LIST

Patent Literature

Patent Document 1: Japanese Patent No. 4853979B

SUMMARY OF INVENTION

Technical Problem

However, in the above-described Patent Document 1, the gas-flow passages in the support body having the same diameter throughout the longitudinal direction makes it easy for a fuel gas to pass straight through the gas-flow passages, and there has thus been room for improvement in terms of improving the power generation efficiency.

An object of the present invention is to provide a cell, a cell stack device, a module, and a module-containing device capable of improving power generation efficiency.

Solution to Problem

A cell according to the present invention includes a support body having a pillar shape, a first electrode layer located on the support body, a solid electrolyte layer located on the first electrode layer, and a second electrode layer located on the solid electrolyte layer. A gas-flow passage passing through the support body in a longitudinal direction thereof is provided in an interior of the support body. A diameter of the gas-flow passage at at least a first end portion of both end portions of the gas-flow passage in the longitudinal direction is greater than a diameter of the gas-flow passage at a central portion.

A cell stack device according to the present invention includes a cell stack including a plurality of the cells described above. The plurality of the cells are arranged.

A module according to the present invention includes the above-described cell stack device housed in a housing container.

A module-containing device according to the present invention includes the above-described module, an auxiliary device configured to operate the module, and an external casing containing the module and the auxiliary device therein.

Advantageous Effects of Invention

In the cell according to the present invention, the diameter of the gas-flow passage at at least the first end portion of both end portions is greater than the diameter at the central portion, which makes it possible to supply fuel gas to the first electrode efficiently. This makes it possible to achieve a cell having improved power generation efficiency, as well as a cell stack device, a module, and a module-containing device including such a cell.

BRIEF DESCRIPTION OF DRAWINGS

FIG. 1A is a horizontal cross-sectional view, and FIG. 1B is a side view.

FIG. 3A is a horizontal cross-sectional view of a first end portion and a second end portion of the cell in a longitudinal direction thereof, and FIG. 3B is a horizontal cross-sectional view of a central portion of the cell in the longitudinal direction thereof.

FIG. 6A is a side view schematically illustrating the cell stack device, and FIG. 6B is a cross-sectional view illustrating parts of the areas surrounded by broken lines in the cell stack device in FIG. 6A in an enlarged manner.

DESCRIPTION OF EMBODIMENT

Cell

Figure 1A:
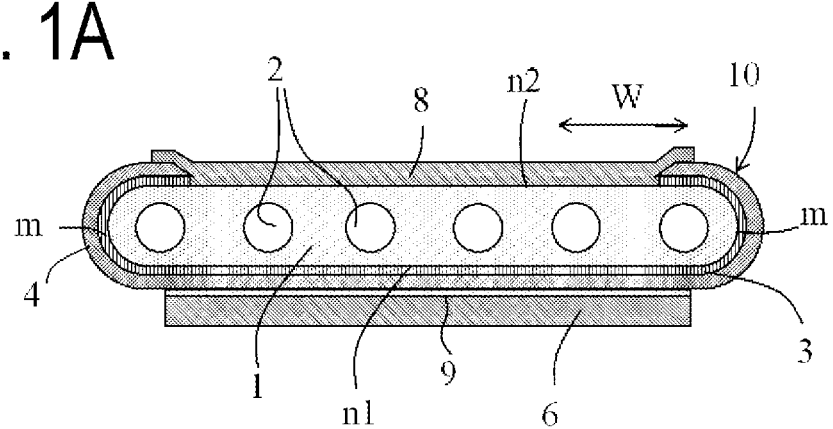
FIGS. 1A and 1B illustrate an example of an embodiment of a cell.
Figure 1B:
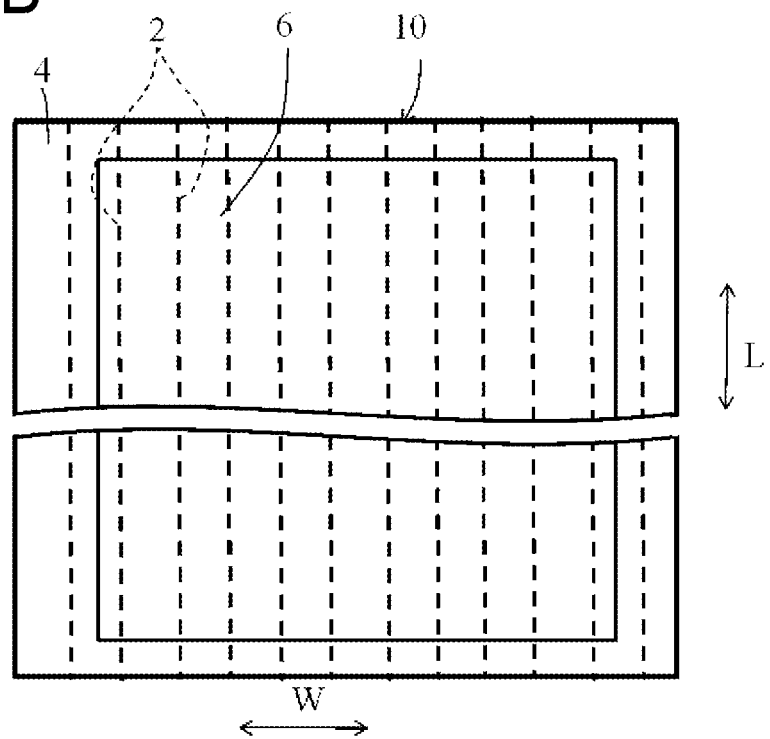

FIGS. 1A and 1B illustrate an example of an embodiment of a cell. FIG. 1A is a horizontal cross-sectional view, and FIG. 1B is a side view. Here, both diagrams illustrate parts of the configurations of a fuel cell 10 in an enlarged manner. Other drawings also illustrate parts in an enlarged manner. Note that in the following descriptions, the cell 10 will be referred to both as a "solid oxide fuel cell" and simply as a "cell".

In the example illustrated in FIGS. 1A and 1B, the cell 10 includes a support body 1. This support body 1 has a pillar shape. Additionally, in the example illustrated in FIGS. 1A and 1B, the support body 1 has a flat plate shape. Furthermore, the support body 1 has a hollow flat plate shape, and a long, narrow plate shape. In the interior of the support body 1, a plurality of gas-flow passages 2 are defined at appropriate intervals and pass through the support body 1 along a longitudinal direction L thereof. The cell 10 has a structure in which various members are provided on the support body 1.

The support body 1 has a plate shape constituted of a pair of main surfaces (a first main surface n1 and a second main surface n2) which face each other and arced surfaces (side surfaces) m which connect the pair of main surfaces n1 and n2, as can be understood from the shapes illustrated in FIGS. 1A and 1B. Furthermore, as in the example illustrated in FIGS. 1A and 1B, the plate-shaped support body 1 also has a lateral direction w.

Here, a fuel electrode layer 3, which is a first electrode layer, is disposed covering the first main surface n1 (a main surface on one side; a lower surface) and the arced surfaces m on both sides thereof. A solid electrolyte layer 4 formed from a ceramic having a gas blocking property is furthermore disposed covering the fuel electrode layer 3. From the point of view of improving the power generation capability, the thickness of the solid electrolyte layer 4 is desirably 40 µm or less, more desirably 20 µm or less, and further more desirably 15 µm or less.

In addition, an oxygen electrode layer 6, which is a second electrode layer, is disposed on the surface of the solid electrolyte layer 4 on the first main surface n1 and faces the fuel electrode layer 3 with an intermediate layer 9 located therebetween. That is, the intermediate layer 9 is provided between the oxygen electrode layer 6 and the solid electrolyte layer 4.

A dense interconnector layer 8 formed from lanthanum chromite-based ($LaCrO_3$ based) oxide having a gas blocking property is disposed on the second main surface n2 (a main surface on another side; an upper surface) on which the solid electrolyte layer 4 is not laminated, with a cohesion layer (not illustrated) located therebetween.

That is, the fuel electrode layer 3 and the solid electrolyte layer 4 are disposed from the first main surface n1, around the arced surfaces m at both ends, and up to the second main surface n2. Both end portions of the interconnector layer 8 are laminated and bonded to corresponding both end portions of the solid electrolyte layer 4.

In other words, the support body 1 is surrounded by the solid electrolyte layer 4 and the interconnector layer 8, and is configured such that a fuel gas flowing through the interior thereof does not leak to the exterior. In other words, the solid electrolyte layer 4 and the interconnector layer 8 form a tubular body having a gas blocking property. The interior of the tubular body serves as a fuel gas flow passage. The fuel gas supplied to the fuel electrode layer 3 and an oxygen-containing gas supplied to the oxygen electrode layer 6 are blocked by the tubular body.

To be more specific, as illustrated in FIG. 1B, the oxygen electrode layer 6, which has a rectangular planar shape, is not provided at the upper and lower end portions of the support body 1, while the interconnector layer 8 is, although not illustrated here, provided from the upper end portion of the support body 1 in the longitudinal direction L thereof to the lower end portion thereof. Both end portions of the support body 1 in the lateral direction W thereof are bonded to the surfaces of corresponding end portions of the solid electrolyte layer 4. Note that the configuration may be such that the interconnector layer 8 is not provided at the lower end portion of the support body 1 in the longitudinal direction L thereof. Additionally, the configuration may be such that the interconnector layer 8 is provided at neither the upper end portion nor the lower end portion of the support body 1 in the longitudinal direction L thereof.

In the cell 10, a part where the fuel electrode layer 3 and the oxygen electrode layer 6 face each other with the solid electrolyte layer 4 located therebetween functions as a fuel cell and generates power. That is, oxygen-containing gas such as air flows to the outer side of the oxygen electrode layer 6 and the fuel gas (hydrogen-containing gas) flows in the gas-flow passages 2 within support body 1, and the gases are heated to a predetermined actuation temperature, generating power as a result. Then, current generated by this power generation is collected via the interconnector layer 8 disposed on the support body 1.

Although the above-described cell 10 is described as a cell in which the first electrode layer is the fuel electrode layer 3 and the second electrode layer is the oxygen electrode layer 6, the cell 10 may be configured such that the first electrode layer is the oxygen electrode layer 6, the second electrode layer is the fuel electrode layer 3, and the oxygen-containing gas flows through the gas-flow passages 2.

Each member constituting the fuel cell 3 illustrated in FIGS. 1A and 1B will be described next.

A generally-known material can be used for the fuel electrode layer 3 serving as the first electrode layer. For example, the fuel electrode layer 3 can be formed from $ZrO_2$ (referred to as a stabilized zirconia; also includes partially stabilized zirconia) forming a solid solution with a porous electrically-conductive ceramic such as a rare earth element oxide and at least one of Ni and NiO.

The solid electrolyte layer 4 is required to function as an electrolyte that allows electrons to move between the electrodes and have a gas blocking property that prevents fuel gas and oxygen-containing gas leaks. The solid electrolyte layer 4 is formed of $ZrO_2$ forming a solid solution with from 3 to 15 mol % of a rare earth element oxide. Note that the solid electrolyte layer 4 may be formed from another material as long as that material exhibits the above-described properties.

The material for the oxygen electrode layer 6 serving as the second electrode layer is not particularly limited, and any generally-known material may be used. For example, the oxygen electrode layer 6 may be formed of an electrically-conductive ceramic made from a so-called $ABO_3$ perovskite oxide. The oxygen electrode layer 6 is required to be gas permeable, and the open porosity of the oxygen electrode layer 6 is preferably no less than 20% and particularly preferably in the range of from 30 to 50%.

The interconnector layer 8 can be formed from electrically-conductive ceramics, but because the interconnector layer 8 makes contact with the fuel gas (hydrogen-containing gas) and oxygen-containing gas (air or the like), the interconnector layer 8 is required to be reduction resistant and oxidation resistant. As such, a lanthanum chromite perovskite oxide ($LaCrO_3$ oxide) is suitable for use as the interconnector layer 8. The interconnector layer 8 is required to be dense in order to prevent leaks of the fuel gas flowing through the plurality of gas-flow passages 2 defined in the support body 1 and leaks of the oxygen-containing gas flowing on the outer side of the support body 1. As such, the interconnector layer 8 preferably has a relative density of no less than 93% and particularly no less than 95%.

The support body 1 is required to be gas permeable to allow the fuel gas to permeate through to the fuel electrode layer 3 and is required to also be electrically conductive in order to allow current collection through the interconnector layer 8. Therefore, it is necessary to employ a material that satisfies these requirements, and as such, a material such as an electrically-conductive ceramic or cermet can be used for the support body 1. For production of the cells 10, if the support body 1 is produced through co-firing with the fuel electrode layer 3 or the solid electrolyte layer 4, the support body 1 is preferably formed of an iron group metal component and a specific rare earth oxide ($Y_2O_3$, $Yb_2O_3$, or the like). Additionally, to ensure a desired gas permeability, the support body 1 preferably has an open porosity of no less than 30%, and particularly in the range from 35 to 50%. The support body 1 also preferably has an electrical conductivity of no less than 300 S/cm and particularly no less than 440 S/cm.

The intermediate layer 9 can be disposed between the solid electrolyte layer 4 and the oxygen electrode layer 6 in order to strengthen the bond between the solid electrolyte layer 4 and the oxygen electrode layer 6 and suppress the formation of a reactive layer having a high electric resistance due to a reaction between the components of the solid electrolyte layer 4 and the components of the oxygen electrode layer 6.

The intermediate layer 9 can be formed as a composition that contains Cerium (Ce) and another rare earth element oxide. The intermediate layer 9 preferably has a composition expressed by, for example,

$$(CeO_2)_{1-x}(REO_{1.5})_x, \qquad (1):$$

where RE represents at least one of Sm, Y, Yb, and Gd, and x represents a number satisfying 0<x≤0.3.

Furthermore, in order to reduce the electric resistance, Sm or Gd is preferably used as RE. For example, the intermediate layer 9 is preferably formed from a $CeO_2$ forming a solid solution with from 10 to 20 mol % of $SmO_{1.5}$ or $GdO_{1.5}$.

Additionally, the intermediate layer 9 can be formed as two layers in order to strongly bond the solid electrolyte layer 4 to the oxygen electrode layer 6 and further suppress the formation of a reaction layer having a high electric resistance due to a reaction between components of the solid electrolyte layer 4 and components of the oxygen electrode layer 6.

Additionally, although not illustrated, a cohesion layer for reducing, for example, a difference in thermal expansion coefficients between the interconnector layer 8 and the support body 1 may also be disposed between the interconnector layer 8 and the support body 1.

A composition similar to that of the fuel electrode layer 3 can be used as the cohesion layer. For example, the cohesion layer can be formed of $ZrO_2$ (called stabilized zirconia) forming a solid solution with a rare earth element oxide such as YSZ and Ni and/or NiO. Note that the $ZrO_2$ forming a solid solution with the rare earth element oxide and the Ni and/or NiO are preferably set to a volume ratio in a range of 40:60 to 60:40.

Figure 2:
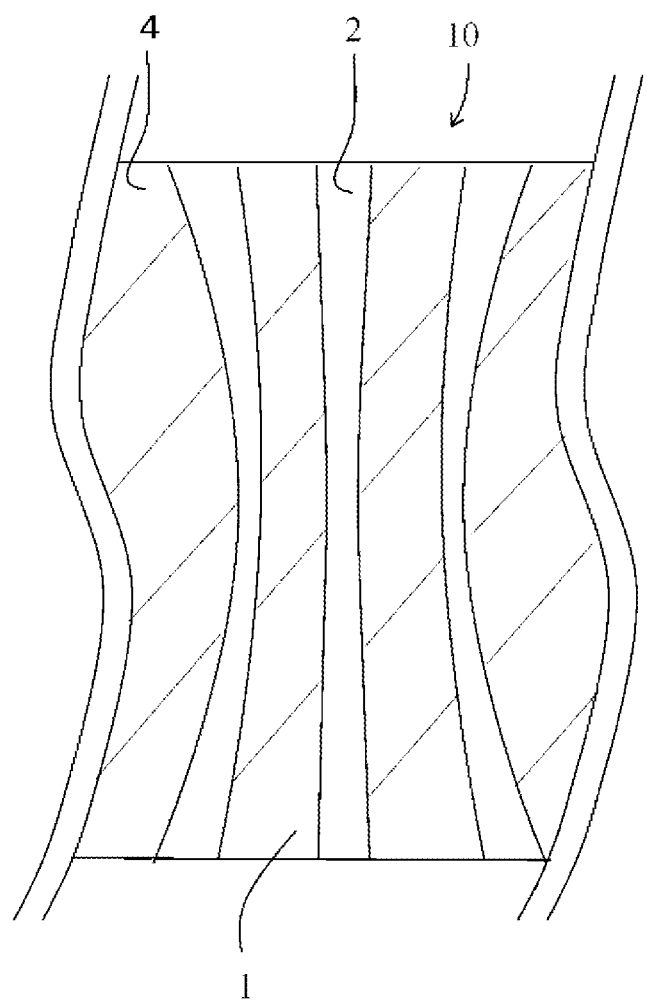
FIG. 2 illustrates part of a vertical cross-sectional view of the cell illustrated in FIGS. 1A and 1B.

FIG. 2 illustrates part of a vertical cross-sectional view of the cell 10 illustrated in FIGS. 1A and 1B viewed along the gas-flow passages 2.

As illustrated in FIG. 2, in each gas-flow passage 2, at least a first end portion of both end portions in the longitudinal direction L has a greater diameter than the diameter of a central portion. Note that in the example illustrated in FIG. 2, the diameters of both end portions in the longitudinal direction are greater than the diameter of the central portion. Additionally, FIG. 1B illustrates the shapes of the gas-flow passages 2 in a simplified manner.

Here, "central portion" refers to a part in the center of the support body 1 when the gas-flow passages 2 are divided into three parts in the longitudinal direction of the support body 1. "End portion", meanwhile, refers to a part on one end side when the gas-flow passages 2 are divided into three parts, and "both end portions" refers to parts on both ends when the gas-flow passages 2 are divided into three parts.

For example, in the case where the first end portion of the gas-flow passage 2 is taken as a fuel gas inlet and a second end portion is taken as an outlet, making the diameter of the second end portion greater than the diameter of the central portion ensures that fuel gas not used in power generation is efficiently discharged. This makes it possible to suppress a situation in which the fuel gas builds up in the cell 10. Accordingly, new fuel gas is supplied efficiently, which makes it possible to improve the power generation efficiency. Note that in the example illustrated in FIGS. 1A and 1B, the oxygen electrode layer 6 does not reach the second end portion of the cell 10, and thus the second end portion of the cell 10 does not function as a power generation portion. As such, the power generation efficiency is not negatively affected even if it becomes easy for the fuel gas to be discharged from the second end portions of the gas-flow passages 2.

Additionally, in the case where the diameter of the first end portion is greater than the central portion, the amount of fuel gas flowing into the cell 10 can be increased. Furthermore, in this case, the diameter at the central portion is less than at the first end portion, which makes it difficult for the fuel gas to flow in the gas-flow passages 2 and increases pressure loss. The fuel gas thus diffuses easily within the support body 1, which makes it possible to improve the power generation efficiency.

Additionally, in each gas-flow passage 2, the diameter of at least the first end portion of both end portions in the longitudinal direction is from 1.003 to 1.03 times the diameter of the central portion. In the case where the diameter is no less than 1.003 times, one of the first end portion and the second end portion of the gas-flow passage 2 has a greater diameter than the central portion, as described earlier. This improves the power generation efficiency. On the other hand, in the case where the diameter is no greater than 1.03 times, the diameter of the gas-flow passage 2 at one of the first end portion and the second end portion of the support body 1 is not too large. This makes it possible to suppress a situation in which an area between the inner wall of the gas-flow passage 2 and the surface of the support body 1 becomes too thin at the end portion of the support body 1. The strength at the end portions of the support body 1 can be increased as a result.

However, the gas-flow passage 2 is not limited to this example, and it is sufficient for the diameter at at least the first end portion of both end portions thereof to be greater than the diameter at the central portion. That is, the gas-flow passage 2 may be configured such that the diameter at only the first end portion is greater than the diameter at the central portion. In this case, the diameter at the second end portion may be the same as or less than the diameter at the central portion.

Conversely, in the gas-flow passage 2, the diameter at only the second end portion may be greater than the diameter at the central portion. In this case, the diameter at the first end portion may be the same as or less than the diameter at the central portion.

However, preferably, both end portions of the gas-flow passage 2 in the longitudinal direction thereof have greater diameters than the central portion.

In the example illustrated in FIG. 2, the diameter at at least the first end portion is greater than the diameter at the central portion in all of the three gas-flow passages 2 that are illustrated. However, the configuration is not limited thereto, and the diameter at at least the first end portion may be greater than the diameter at the central portion in all of the gas-flow passages 2 provided in the support body 1. Furthermore, the configuration is not limited to these examples, and the diameter at at least the first end portion may be greater than the diameter at the central portion in only one of the gas-flow passages 2 provided in the support body 1.

Additionally, of the three gas-flow passages 2 illustrated in FIG. 2, the gas-flow passages 2 on the right and left sides are preferably formed such that centers of the gas-flow passages 2 between the central portion and one of the first end portion and the second end portion are positionally shifted from each other, when the gas-flow passages 2 are viewed in a horizontal cross-section. In this case, it is even more difficult for the fuel gas to flow in the gas-flow passages 2, which increases pressure loss. As a result, the fuel gas diffuses more easily within the support body 1, which makes it possible to improve the power generation efficiency even more.

Additionally, as in the example illustrated in FIG. 2, a plurality of the gas-flow passages 2 are provided, and a gap between adjacent gas-flow passages 2 at the first end portions and the second end portions thereof is greater than a gap between the adjacent gas-flow passages 2 at the central portions thereof. As such, the thicknesses between the gas-flow passages 2 can be increased at the first end portion and the second end portion of the support body 1, on which external forces tend to act. This makes it possible to increase the strength.

With respect to the gaps between adjacent gas-flow passages 2, in the case where the gap at the central portion is taken as 1, for example, the gap at one of the first end portion and the second end portion is preferably in a range of from 1.003 to 1.03.

However, the configuration is not limited to the example illustrated in FIG. 2, and the gap between adjacent gas-flow passages 2 at only one of the first end portion and the second end portion may be greater than the gap between the adjacent gas-flow passages 2 at the central portion.

Additionally, in the example illustrated in FIG. 2, the gap between adjacent gas-flow passages 2 at at least the first end portion is greater than the gap between the adjacent gas-flow passages 2 at the central portion, in all of the gas-flow passages 2 that are illustrated. However, the configuration is not limited thereto, and the gap between adjacent gas-flow passages 2 at at least the first end portion may be greater than the gap between the adjacent gas-flow passages 2 at the central portion, among all of the gas-flow passages 2 provided in the support body 1. Furthermore, the configuration is not limited to these examples, and the gap between adjacent gas-flow passages 2 at at least the first end portion may be greater than the gap between the adjacent gas-flow passages 2 at the central portion, in only one of each set of two adjacent gas-flow passages 2 provided in the support body 1.

Figure 3A:
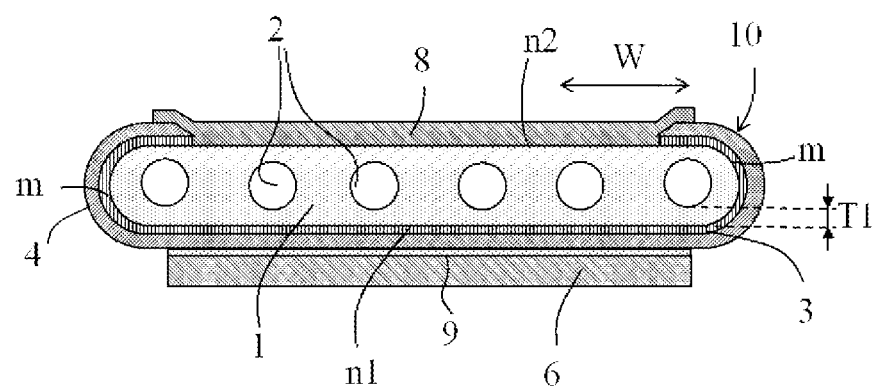
FIGS. 3A and 3B illustrate another example of an embodiment of a cell.
Figure 3B:
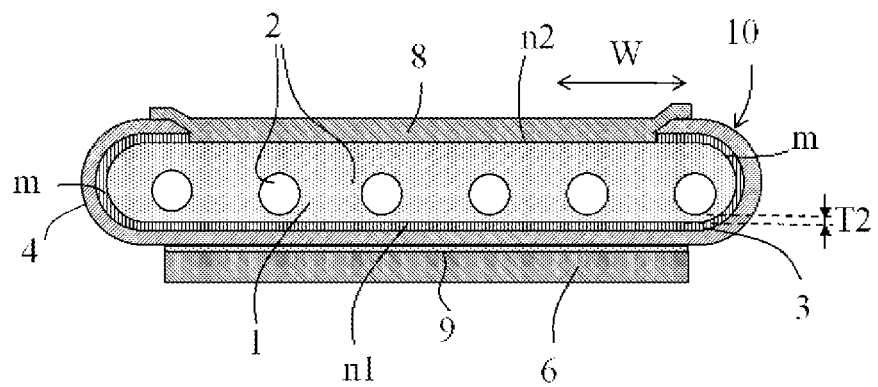

FIGS. 3A and 3B illustrate another example of an embodiment of a cell. FIG. 3A is a horizontal cross-sectional view of the first end portion and the second end portion of the cell in a longitudinal direction thereof, and FIG. 3B is a horizontal cross-sectional view of the central portion of the cell in the longitudinal direction thereof.

As illustrated in FIGS. 3A and 3B, in each gas-flow passage 2, at least the first end portion of both end portions in the longitudinal direction L has a greater diameter than the diameter of the central portion, in the same manner as in FIG. 2.

Meanwhile, in the cell 10 illustrated in FIGS. 3A and 3B, a gap T1 between the gas-flow passages 2 and the fuel electrode layer 3 at both end portions is greater than a gap T2 between the gas-flow passages 2 and the fuel electrode layer 3 at the central portion. For example, in the case where the first end portion of the gas-flow passages 2 serves as a fuel gas inlet and the second end portion as an outlet, the gap T1 between the gas-flow passages 2 and the fuel electrode layer 3 at the second end portion is greater than at the central portion. This makes it possible to increase the thickness at the second end portion of the support body 1, on which external forces tend to act, and this in turn makes it possible to increase the strength. Additionally, because the gap T1 between the gas-flow passages 2 and the fuel electrode layer 3 at the first end portion is greater than at the central portion, the gap T1 at the first end portion of the gas-flow passages 2 is larger, which reduces the amount of fuel gas consumed. Although the flow rate of the fuel gas is lower at the central portion of the gas-flow passages 2 than at the first end portion, the gap T2 is smaller at the central portion, and thus the amount of fuel gas consumed can be brought close to the amount consumed at the first end portion. The power generation efficiency can be increased as a result.

With respect to the gap between the gas-flow passages 2 and the fuel electrode layer 3, in the case where the gap T2 at the central portion is taken as 1, for example, the gap T1 at one of the first end portion and the second end portion is preferably in a range of from 1.003 to 1.03.

However, the configuration is not limited to the example illustrated in FIGS. 3A and 3B, and the gap between the gas-flow passages 2 and the fuel electrode layer 3 at only one of the first end portion and the second end portion may be greater than the gap between the gas-flow passages 2 and the fuel electrode layer 3 at the central portion.

Furthermore, although the gap between the gas-flow passages 2 and the fuel electrode layer 3 is greater at at least the first end portion than at the central portion in the example illustrated in FIGS. 3A and 3B in all of the gas-flow passages 2 that are illustrated, the configuration is not limited thereto. The gap between the gas-flow passages 2 and the fuel electrode layer 3 may be greater at at least the first end portion than at the central portion at only one of the gas-flow passages 2 provided in the support body 1.

In the example illustrated in FIGS. 3A and 3B, the gap between the gas-flow passages 2 and the fuel electrode layer 3 described above refers to a gap between the gas-flow passages 2 and the surface of the support body on the oxygen electrode side thereof. In the example illustrated in FIGS. 3A and 3B, the gas-flow passages 2 at the central portion are provided closer to the surface of the support body on the oxygen electrode side thereof, such that the gap between the gas-flow passages 2 and the fuel electrode layer 3 is smaller at the first end portion and the second end portion.

Figure 4:
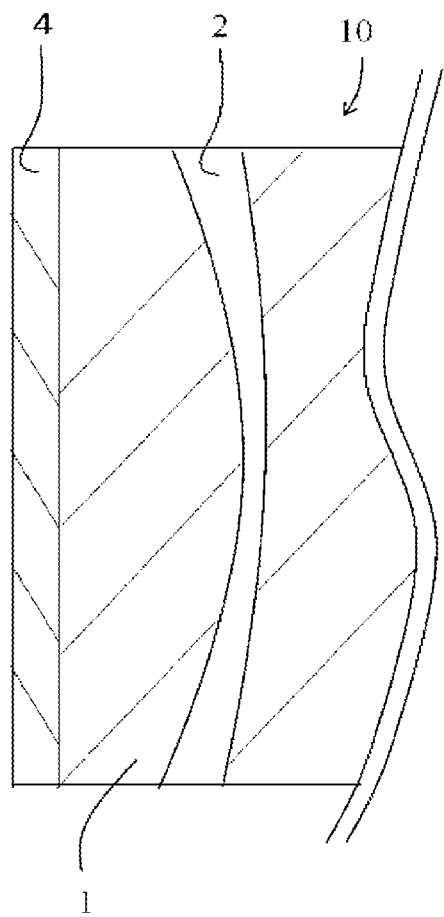
FIG. 4 illustrates yet another example of an embodiment of a cell, and is a vertical cross-sectional view of an end portion of the cell in a lateral direction thereof.

FIG. 4 illustrates yet another example of an embodiment of a cell, and is a vertical cross-sectional view of an end portion of the cell in a lateral direction thereof.

As illustrated in FIG. 4, the gas-flow passage 2 is curved. As such, in the case where the first end portion of the gas-flow passage 2 serves as the fuel gas inlet and the second end portion serves as the outlet, it becomes easy for the fuel gas flowing in from the first end portion to make contact with the inner wall of the gas-flow passage 2, which makes it easy for the fuel gas to diffuse into the support body 1. The fuel gas can reach the solid electrolyte layer 4 more easily as a result.

Meanwhile, although the example in FIG. 4 illustrates a configuration in which only one of the gas-flow passages 2 is curved, the configuration is not limited thereto, and a plurality of the gas-flow passages 2 provided in the support body 1 may be curved. Alternatively, all of the gas-flow passages 2 provided in the support body 1 may be curved.

In the example illustrated in FIG. 3A and FIG. 3B, the fuel electrode layer 3 is provided from the first main surface n1 to the second main surface n2 across the arced surface m, at the end portions of the support body 1 in the lateral direction thereof. In other words, the gas-flow passages 2 provided at the end portions of the support body 1 in the lateral direction thereof are surrounded by the fuel electrode layer 3. The gas-flow passages 2 being curved toward the central portion of the support body 1 in the lateral direction in this manner makes it easy for the fuel gas, which more easily diffuses into the support body 1 as described earlier, to reach a broad range of the fuel electrode layer 3. The power generation efficiency can be increased as a result.

Figure 5:
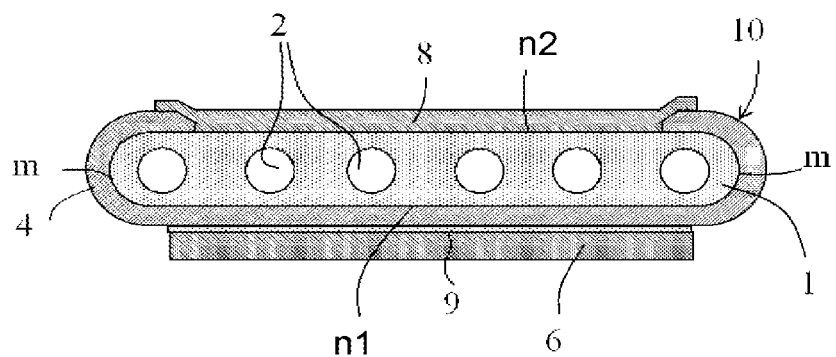
FIG. 5 is a horizontal cross-sectional view of another embodiment, illustrating a fuel cell in which a fuel electrode layer serves as a support body.

FIG. 5 is a horizontal cross-sectional view of another embodiment, illustrating a fuel cell in which a fuel electrode layer serves as a support body. The same actions and effects as the embodiment illustrated in FIGS. 1A and 1B can be achieved in this case as well. That is, in the embodiment illustrated in FIGS. 1A and 1B, the fuel electrode layer 3, the solid electrolyte layer 4, and the oxygen electrode layer 6 are laminated on the support body 1; however, as in the embodiment illustrated in FIG. 5, the fuel electrode layer itself may be used as the support body 1 and the solid electrolyte layer 4 and the oxygen electrode layer 6 may be disposed on this support body 1.

Although a plurality of the gas-flow passages 2 are provided in the support body 2 in the example illustrated in FIG. 5, only a single gas-flow passage 2 may be provided.
Measurement Method A method for measuring the diameter of the gas-flow passages 2 at at least the first end portion of both end portions in the longitudinal direction, and the diameter of the gas-flow passages 2 at the central portion in the longitudinal direction, will be described next. First, the support body 1 is divided into three parts in the longitudinal direction so as to divide the gas-flow passages 2 into three regions. In each region, three locations at equal intervals in the longitudinal direction are taken, the diameter of the gas-flow passages 2 is calculated at each location, and the average value thereof is found. The average value at the region in the middle is taken as the diameter of the gas-flow passages 2 at the central portion in the longitudinal direction, and the average value at a region on one of the first end portion side and the second end portion side is taken as the diameter of the gas-flow passages 2 on one of the first end portion side and the second end portion side in the longitudinal direction.

The calculation of the diameter of the gas-flow passages 2 will be described in further detail. In the case where the diameter at a given location of a gas-flow passage 2 in the longitudinal direction thereof is calculated, the support body 1 is first cut at that location to obtain a horizontal cross-section such as that illustrated in FIG. 1A. The cross-section is then subjected to mechanical polishing, and the diameter of the gas-flow passage 2 is calculated using a predetermined method such as using vernier calipers or through image processing. The direction along which the diameter of the gas-flow passage 2 is measured is made to match for the measurements at each location. For example, if the length has been calculated along the lateral direction w at a given location, the lengths are calculated along the lateral direction w in the measurements at the other locations as well.

A method for measuring the gap between the gas-flow passages 2 and the fuel electrode layer 3 at at least the first end portion of both end portions in the longitudinal direction, and the gap between the gas-flow passages 2 and the fuel electrode layer 3 at the central portion in the longitudinal direction, will be described next. First, the support body 1 is divided into three parts in the longitudinal direction so as to create three regions. Furthermore, each region is divided into four parts, at equal intervals in the longitudinal direction, the distance between the gas-flow passages 2 and the fuel electrode layer 3 is calculated at each resulting face, and the average value thereof is found. The average value at the region in the middle is taken as the gap between the gas-flow passages 2 and the fuel electrode layer 3 at the central portion in the longitudinal direction, and the average value at a region on one of the first end portion side and the second end portion side is taken as the gap between the gas-flow passages 2 and the fuel electrode layer 3 on one of the first end portion side and the second end portion side in the longitudinal direction.

The calculation of the distance between the gas-flow passages 2 and the fuel electrode layer 3 will be described in further detail. First, the support body 1 is cut and subjected to mechanical polishing, in the same manner as described above. Next, the distance from the inner walls of the gas-flow passages 2 to the fuel electrode layer 3 in a thickness direction of the support body 1 may be measured using a known image processing method.

A method for measuring the gap between adjacent gas-flow passages 2 at at least the first end portion, and the gap between adjacent gas-flow passages 2 at the central portion, will be described next. First, the support body 1 is divided into three parts in the longitudinal direction so as to divide the gas-flow passages 2 into three regions. Each region is divided into four parts, at equal intervals in the longitudinal direction, the distance between adjacent gas-flow passages 2 is calculated at each resulting face, and the average value thereof is found. The average value at the region in the middle is taken as the gap between adjacent gas-flow passages 2 at the central portion, and the average value at a region on one of the first end portion side and the second end portion side is taken as the gap between adjacent gas-flow passages 2 at at least the first end portion.

The calculation of the gap between adjacent gas-flow passages 2 will be described in further detail. First, the support body 1 is cut and subjected to mechanical polishing, in the same manner as described above. Next, the distance between the inner walls of adjacent gas-flow passages 2 in the lateral direction w is measured through a method such as using vernier calipers or image processing.

A method for confirming that the gas-flow passage 2 is curved will be described next. First, the gas-flow passage 2 is divided into six parts at equal intervals along the longitudinal direction of the support body 1. A gap between the gas-flow passage 2 and the arced surface m at each resulting face is then measured. At this time, a gap between the gas-flow passage 2 and the arced surface m at the first face from the first end portion, a gap between the gas-flow passage 2 and the arced surface m at the second face, a gap between the gas-flow passage 2 and the arced surface m at the third face, a gap between the gas-flow passage 2 and the arced surface m at the fourth face, and a gap between the gas-flow passage 2 and the arced surface m at the fifth face are taken as a distance 1, a distance 2, a distance 3, a distance 4, and a distance 5, respectively. The gas-flow passage 2 is considered curved when distance 1<distance 2<distance 3 and distance 5<distance 4<distance 3 at this time.

The calculation of the gap between the gas-flow passage 2 and the arced surface m at each face will be described in further detail. First, the support body 1 is cut and subjected to mechanical polishing, in the same manner as described above. The gap between the inner wall of the gas-flow passage 2 and the arced surface m in the lateral direction w may then be measured using a known image processing method.

Manufacturing Method

An example of a method for manufacturing the cell 10 described above will be described next. First, for example, a green body is prepared by mixing at least one of Ni and NiO powder, powder of inorganic oxides such as $Y_2O_3$, an organic binder, and a solvent. The organic binder is mixed at an amount adjusted so that the green body exhibits fluidity. From the standpoint of applicability for injection molding, which will be described later, a thermoplastic resin is preferably used as the organic binder. A support body powder compact is then made through injection molding using this green body, and the compact is dried. Here, a calcined body in which the support body powder compact is calcined for 2 to 6 hours at from 900 to 1000° C. may be used as the support body powder compact.

Additionally, a resin powder compact having a predetermined shape is fixed, using tools such as pins, within a metal mold used for the injection molding. A resin that vaporizes and burns off at a temperature attained when the support body powder compact is calcined or fired is used as the material for the resin powder compact. The shape of the resin powder compact is set to the desired shape of the gas-flow passages 2. For example, when the gas-flow passages 2 are formed such that the diameters thereof are greater at the first end portion or the second end portion than at the central portion as illustrated in FIG. 2, a resin powder compact having the same shape as the gas-flow passages 2 may be prepared.

The support body powder compact having the resin powder compact in its interior is obtained by carrying out injection molding by injecting the above-described green body into the metal mold in which the resin powder compact is provided. Thereafter, the support body powder compact is calcined or fired, raising the support body powder compact to a predetermined temperature and burning off the resin powder compact. As such, the region in the support body that was occupied by the resin powder compact becomes an empty space. This makes it possible to obtain the support body 1 having the gas-flow passages 2 with a desired shape.

Next, for example, the raw materials of NiO and $ZrO_2$ (YSZ) forming a solid solution with $Y_2O_3$ are weighed and mixed in accordance with a predetermined compounding composition. After this, a fuel electrode layer slurry is prepared by mixing an organic binder and a solvent in the mixed powder.

Then, a slurry formed by adding toluene, a binder powder, a commercially-available dispersing agent, and the like to $ZrO_2$ powder forming a solid solution with a rare earth element oxide is molded using a doctor blade method or the like to manufacture a sheet-shaped solid electrolyte layer powder compact.

A fuel electrode layer powder compact is formed by applying the slurry for the fuel electrode layer to the obtained sheet-shaped solid electrolyte layer powder compact, and a sheet-shaped laminated powder compact is formed as a result. The fuel electrode layer power compact side surface of the sheet-shaped laminated powder compact on which the fuel electrode layer powder compact and the solid electrolyte layer powder compact are laminated is laminated on the electrically conductive support body powder compact, and a powder compact is formed.

Next, the laminated powder compact described above is calcined for 2 to 6 hours at from 800 to 1200° C. Next, a slurry is manufactured by mixing an interconnector layer material (for example, $LaCrMgO_3$-based oxide powder), an organic binder, and a solvent. The subsequent steps for the method for manufacturing the fuel cell having a cohesion layer will be described.

Next, a cohesion layer powder compact located between the supporting body 1 and the interconnector layer 8 is formed. For example, $ZrO_2$ forming a solid solution with Y is mixed with NiO in a volume ratio in a range of 40:60 to 60:40, and the result is dried. A cohesion layer slurry is then prepared by adding an organic binder and the like, and the slurry is applied to the support body powder compact between both end portions of the solid electrolyte layer powder compact to form the cohesion layer powder compact.

Next, the intermediate layer 9 disposed between the solid electrolyte layer 4 and the oxygen electrode layer 6 is formed. For example, raw material powder for an intermediate layer powder compact is prepared by carrying out a thermal treatment for 2 to 6 hours at from 800 to 900° C. on $CeO_2$ powder forming a solid solution with $GdO_{1.5}$. An intermediate layer slurry is produced by adding toluene as a solvent to this raw material powder, and an intermediate layer powder compact is produced by applying this slurry to the solid electrolyte layer powder compact.

After this, an interconnector layer slurry is applied to the cohesion layer powder compact upper surface such that both end portions of the interconnector layer powder compact are laminated on both end portions of the solid electrolyte layer powder compact (calcined body), and a laminated powder compact is produced. Here, it is also possible to prepare an interconnector layer slurry, produce an interconnector layer sheet, laminate the interconnector layer sheet on the cohesion layer powder compact upper surface such that both end portions of the interconnector layer sheet are laminated to both end portions of the solid electrolyte powder compact, and produce a laminated powder compact.

Next, the laminated powder compact described above is subjected to a binder removal treatment, and co-sintering (co-firing) is carried out in an oxygen-containing atmosphere for 2 to 6 hours at from 1400 to 1500° C., and particularly at from 1425 to 1475° C.

Then, by applying a slurry containing an oxygen electrode layer material (for example, an $LaCoO_3$-based oxide powder), a solvent, and a pore-forming agent on an intermediate layer through dipping or the like, and baking the layer for 2 to 6 hours at from 1000 to 1300° C., the cell 10 according to the present embodiment, having the structure illustrated in FIGS. 1A and 1B, can be manufactured.

Cell Stack Device

Figure 6A:
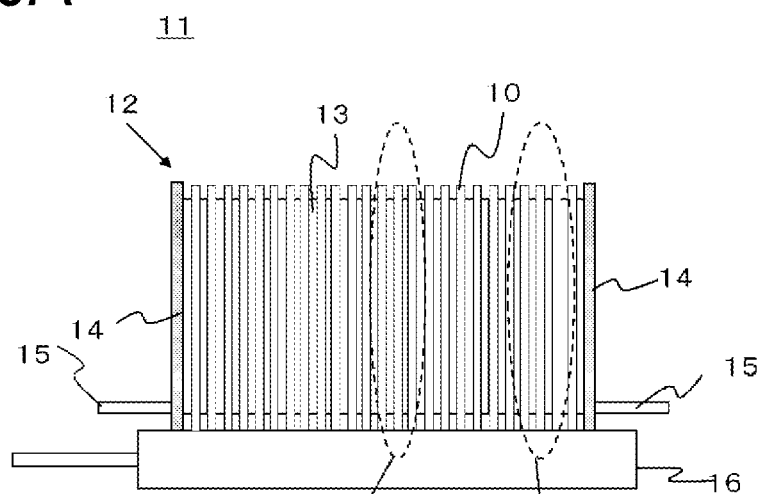
FIGS. 6A and 6B illustrate an example of a cell stack device using the cell illustrated in FIGS. 1A and 1B.
Figure 6B:
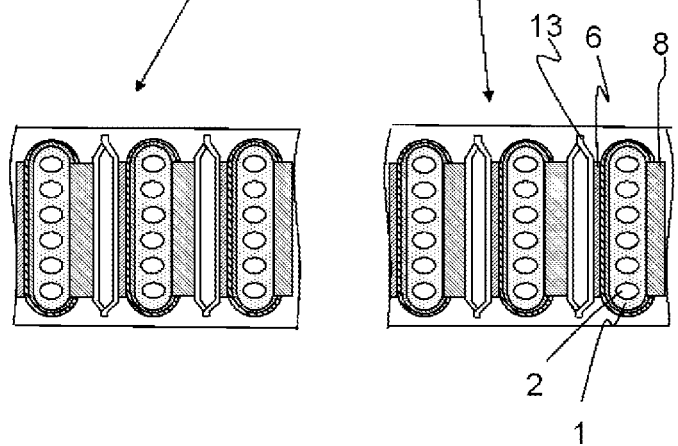

FIGS. 6A and 6B illustrate an example of the cell stack device configured by electrically connecting a plurality of the cells 10 illustrated in FIGS. 1A and 1B in series via current collection members 13. FIG. 6A is a side view schematically illustrating a cell stack device 11, and FIG. 6B is a cross-sectional view illustrating part of the cell stack device 11 indicated in FIG. 6A in an enlarged manner, illustrating the areas surrounded by the broken lines indicated in FIG. 6A. In FIG. 6B, the parts corresponding to the areas surrounded by the broken lines illustrated in FIG. 6A are indicated by arrows for clarity, and in the cell 10 illustrated in FIG. 6B, some of the members such as the intermediate layer described above are not illustrated.

Here, in the cell stack device 11, a cell stack 12 is configured by arranging the cells 10 such that a current collection member 13 is provided between adjacent cells 10, with the lower end portion of each cell 10 fixed using an adhesive such as a glass sealing material to a gas tank 16 for supplying the fuel gas to the cells 10. In addition, the cell stack 12 is pinched from both ends in a direction in which the cells 10 are arranged using elastically deformable electrically conductive members 14, the lower ends of which are fixed to the gas tank 16.

In addition, the electrically conductive members 14 are provided with current extracting members 15, which have a shape extending in the direction in which the cells 10 are arranged toward the outer side, for extracting electrical current generated by the power generation of the cell stack 12 (the cells 10).

In FIG. 6B, two of the cells 10 are electrically connected by one of the current collection members 13. The current collection members 13 are configured by, for example, forming slits extending in the lateral direction at predetermined intervals in the longitudinal direction in a thermally-resistant alloy plate having a rectangular shape and making strip sections between the slits alternately protrude in the thickness direction of the thermally-resistant alloy plate. The cell stack 12 is configured by bonding the strip sections protruding in the opposing direction to corresponding cells 10 using an electrically conductive adhesive.

Module

Figure 7:
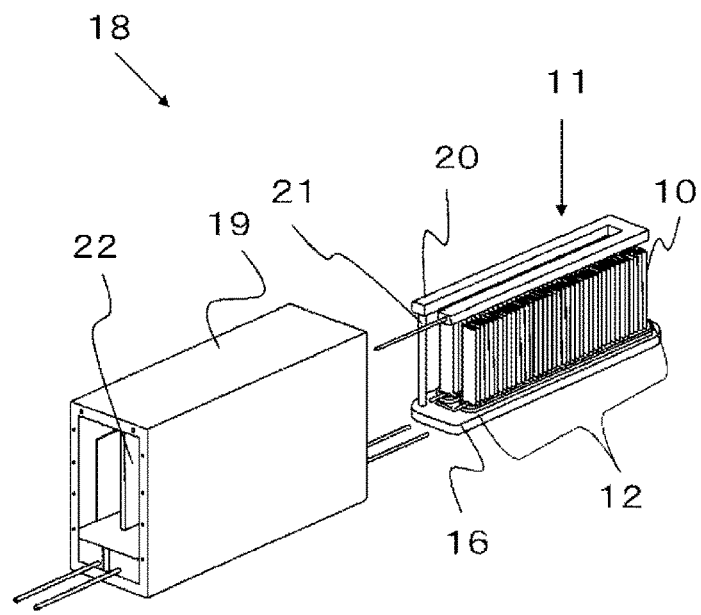
FIG. 7 is an exterior perspective view illustrating an example of a module.

FIG. 7 is an exterior perspective view illustrating an example of a module 18 in which the cell stack device 11 is housed in a housing container 19. The cell stack device 11 illustrated in FIGS. 6A and 6B is configured to be housed within the rectangular parallelepiped-shaped housing container 19.

Here, a reformer 20 for generating fuel gas by reforming raw fuel such as natural gas or kerosene is arranged above the cell stack 12 in order to obtain the fuel gas to be used in the cell 10. Then, the fuel gas generated by the reformer 20 is supplied to the gas tank 16 via a gas distribution pipe 21 and supplied to the gas-flow passages 2 provided in the cell 10 via the gas tank 16.

Here, FIG. 7 illustrates a state in which parts (the front and back surfaces) of the housing container 19 are detached and the fuel cell stack device 11 and the reformer 20 housed in the interior have been removed to the rear. In the fuel cell module 18 illustrated in FIG. 7, the cell stack device 11 can be housed in the housing container 19 by being slid thereinto. Here, the cell stack device 11 may include the reformer 20.

In addition, in FIG. 7, an oxygen-containing gas introducing member 22 provided in the housing container 19 is arranged between a pair of cell stacks 12 lined up in the gas tank 16, and oxygen-containing gas is supplied to the lower end portions of the cells 10 such that the flow of the oxygen-containing gas is synchronized with the flow of the fuel gas so as to flow at the sides of the cell 10 from the lower end portions toward the upper end portions. Then, by inducing a reaction between the fuel gas discharged from the gas-flow passages 2 of the cell 10 with the oxygen-containing gas to be burned at the upper end portion side of the cell 10, the temperature of the cell 10 can be increased and the activation of the fuel cell stack device 11 can be accelerated. In addition, the reformer 20 arranged above the cell 10 (the cell stack 12) can be heated by burning the oxygen-containing gas and the fuel gas discharged from the gas-flow passages 2 of the cell 10 on the upper end portion side of the cell 10. This enables the reformer 20 to carry out the reformation reaction efficiently.

Furthermore, because the cell stack device 11 using the cell 10 described above is housed in the housing container 19 in the fuel cell module 18 of the present embodiment, a module 18 with improved power generation efficiency can be obtained.

Module-Containing Device

Figure 8:
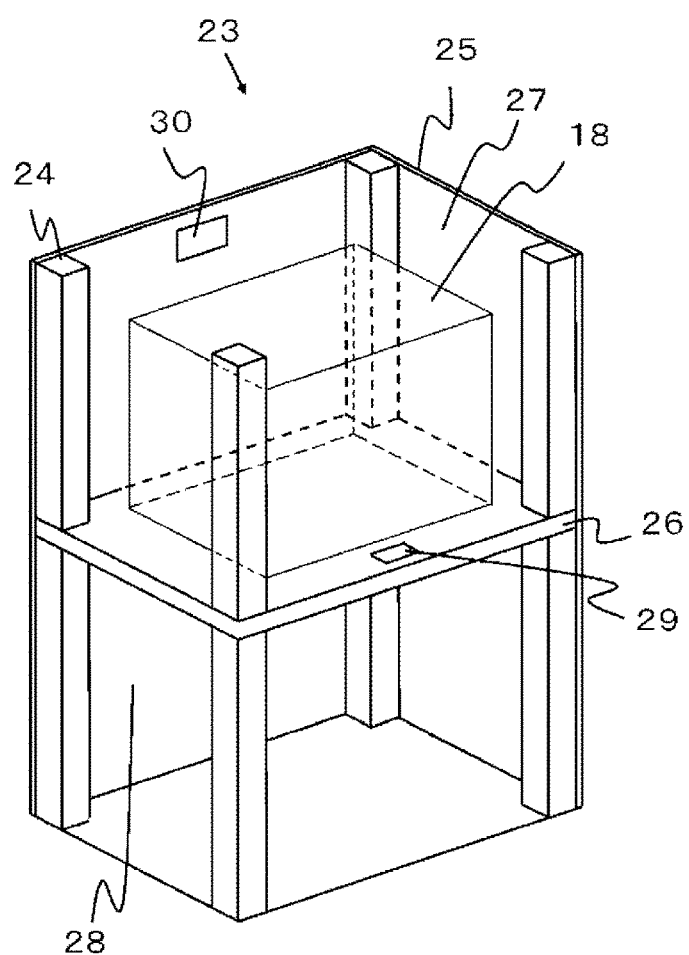
FIG. 8 is a perspective view illustrating a module-containing device with a part thereof not illustrated.

FIG. 8 is a perspective view illustrating an example of a module-containing device in which the module 18 illustrated in FIG. 7 and an auxiliary device configured to operate the cell stack device 11 are housed in an external casing. Note that some of the components of the configuration are not illustrated in FIG. 8.

In a module-containing device 23 illustrated in FIG. 8, an external casing formed of supports 24 and outer plates 25 is divided into upper and lower regions by a dividing plate 26. The upper region forms a module housing chamber 27 for housing the above-described module 18. The lower region forms an auxiliary device housing chamber 28 for housing auxiliary devices configured to operate the module 18. Note that the auxiliary devices housed in the auxiliary device housing chamber 28 are not illustrated.

Furthermore, an airflow hole 29 for allowing air in the auxiliary device housing chamber 28 to flow into the module housing chamber 27 is provided in the dividing plate 26, and an exhaust hole 30 for exhausting air out of the module housing chamber 27 is provided in one of the outer plates 25 of the module housing chamber 27.

In the module-containing device 23, as described above, by configuring the module 18 that can provide improved power generation efficiency to be housed in the module housing chamber 27, it is possible to obtain the module-containing device 23 having improved power generation efficiency.

Although the foregoing embodiment describes a hollow plate solid oxide fuel cell as an example, the solid oxide fuel cell may of course be a cylindrical type or a flat-plate type. In addition, the fuel cell may be a so-called banded-type fuel cell. Furthermore, various intermediate layers may be formed between each of the members in accordance with the functions. In addition, for example, the fuel cell may be a fuel cell in which the oxygen electrode layer, the solid electrolyte layer, and the fuel electrode layer are disposed on the electrically conductive support body.

Furthermore, although the foregoing has described a solid oxide fuel cell (SOFC) as an example of a cell, the present invention is not limited thereto, and can also be applied in an electrolytic cell (SOEC) that generates hydrogen and oxygen ($O_2$) by adding water vapor and a voltage to an electrolytic cell to achieve electrolysis of water vapor (water). The cell stack device, module, and module-containing device described above can also be used as a cell stack device, an electrolytic module, and an electrolytic device including the stated electrolytic cell.

EXAMPLES

Manufacture of Samples

A plurality of cells in which the gas-flow passages have different diameters were manufactured. Specifically, nine samples (N=9) were manufactured, as indicated in Table 1.

The shapes of the cells serving as the samples were a plate shape similar to that illustrated in FIGS. 1A and 1B. The cells were 20 cm long in the longitudinal direction, 26 mm wide in the lateral direction, and 2 mm thick.

The same manufacturing method as that described above was used. Note that the average particle diameter of the NiO powder used to manufacture the support body powder compact was 0.5 µm, and the average particle diameter of the $Y_2O_3$ powder was 0.9 µm. The volume ratio of the support body powder compact after firing-reduction was NiO at 48 volume % and $Y_2O_3$ at 52 volume %. $ZrO_2$ powder forming a solid solution with 8 mol % of $Y_2O_3$, and with a particle diameter of 0.8 µm according to a micro-track method, was used as the solid electrolyte layer raw material powder. The average particle diameter of the NiO powder used to manufacture the fuel electrode layer powder compact was 0.5 µm, and the average particle diameter of the $ZrO_2$ powder forming a solid solution with $Y_2O_3$ was 0.8 µm. The laminate powder compact of the support body powder compact, the solid electrolyte layer sheet, and the fuel electrode layer powder compact were then subjected to a calcination treatment at 1000° C. for three hours. $La(Mg_{0.3}Cr_{0.7})_{0.96}O_3$ was used as the material of the interconnector layer. The interconnector layer slurry was applied to the above-described laminated body, and these were co-fired at 1450° C. for two hours in an oxygen-containing atmosphere. $La_{0.6}Sr_{0.4}Co_{0.2}Fe_{0.8}O_3$ was used as the material of the oxygen electrode layer. The oxygen electrode layer was formed by baking at 1100° C. for four hours. Reduction treatment was carried out by supplying hydrogen gas into the cell and subjecting the support body and the fuel electrode layer to reduction treatment for 10 hours at 850° C., and then cooling the result.

In the support bodies of samples No. 1 to 9, the diameters of the gas-flow passages were controlled as indicated in Table 1 by adjusting the shapes of the resin powder compacts provided within metal molds used for injection molding.

Gas-Flow Passage Diameter Measurement

For the support bodies of samples No. 1 to 9 manufactured as described above, the gas-flow passages 2 were divided into three parts along the longitudinal direction of the support body 1 so as to obtain three regions as described above. In each region, three locations at equal intervals in the longitudinal direction were taken, the diameter of the gas-flow passages was calculated at each location, and the average value thereof was found. The average value at the region in the middle was taken as the diameter of the gas-flow passages at the central portion, and the average value at region on the first end portion side was taken as the diameter of the gas-flow passages at the first end portion.

Power Generation Capability Test

First, hydrogen gas was supplied to the cells in each sample at a temperature of 750° C., and the power densities of the cells were measured. The power density results are shown in Table 1.

Support Body Durability Test

In this test, the cells serving as the samples were fixed to a gas tank using a glass sealing material. Then, cycle testing was carried out by repeating the following pattern ten times: an atmospheric temperature of 750° C. was maintained while circulating fuel gas within the gas tank, and the supply of fuel gas was suddenly stopped and then restarted. After the test, the cells were removed from the gas tank, and the end surfaces of the cells were observed to confirm whether or not the first end portion of the support body had cracked. Cracks arising between the inner walls of the gas-flow passages and the surface of the support body were recognized as such cracks. The results are shown in Table 1.

TABLE 1

| Sample No. | Lower End Portion Diameter (mm) | Central Portion Diameter (mm) | Multiple | Power Density (W/cm$^2$) | Presence/ Absence of Cracks at First End Portion |
|---|---|---|---|---|---|
| 1 | 0.941 | 0.941 | 1.000 | 0.20 | Absent |
| 2 | 0.945 | 0.944 | 1.001 | 0.22 | Absent |
| 3 | 0.945 | 0.943 | 1.002 | 0.22 | Absent |
| 4 | 0.944 | 0.941 | 1.003 | 0.24 | Absent |
| 5 | 0.979 | 0.961 | 1.019 | 0.24 | Absent |
| 6 | 0.986 | 0.962 | 1.025 | 0.24 | Absent |
| 7 | 0.992 | 0.965 | 1.028 | 0.24 | Absent |
| 8 | 0.993 | 0.964 | 1.030 | 0.24 | Absent |
| 9 | 0.999 | 0.965 | 1.035 | 0.24 | Present |

Power Generation Capability Test Result

As is clear from Table 1, sample No. 1 had a low power density. This is because the diameter at the first end portion was less than the diameter at the central portion.

Meanwhile, samples No. 2 and 3 had higher power densities than sample No. 1. This is because the diameter at the first end portion was greater than the diameter at the central portion.

Meanwhile, samples No. 4 to 9 had higher power densities than samples No. 2 and 3. This is because the diameter at the first end portion was no less than 1.003 times the diameter at the central portion.

Durability Test Result

Samples No. 2 to 8 were capable of suppressing cracks at the first end portion of the support body better than sample No. 9. This is because the diameter at the first end portion was no greater than 1.03 times the diameter at the central portion.

REFERENCE SIGNS LIST

1 Support body
1a Support body central portion
1b Support body end portion
2 Gas-flow passage
3 Fuel electrode layer (first electrode layer)
4 Solid electrolyte layer
6 Oxygen electrode layer (second electrode layer)
8 Interconnector layer
10 Fuel cell
10a Cell central portion
10b Cell end portion
11 Cell stack device
18 Module

What is claimed is:

1. A cell comprising:
a body having a first end portion and a second end portion;
a first electrode layer electrically connected to the body;
a solid electrolyte layer located on the first electrode layer; and
a second electrode layer located on the solid electrolyte layer,
wherein
the body comprises a plurality of gas-flow passages passing through the body from the first end portion to the second end portion; and the plurality of gas-flow passages comprise:
one or more center-shifted gas-flow passages that comprise:
a central portion and
a first end portion;
wherein
a center of the one or more center-shifted gas-flow passages at the central portion is laterally shifted from a center of the one or more center-shifted gas-flow passages at the first end portion and
a diameter of the one or more center-shifted gas-flow passages gradually increases from the central portion to the first end portion.

2. The cell according to claim 1, wherein
the one or more center-shifted gas-flow passages further comprise:
a second end portion,
wherein
the center of the one or more center-shifted gas-flow passages at the central portion is also laterally shifted from a center of the one or more center-shifted gas-flow passages at the second end portion.

3. The cell according to claim 2, wherein
a diameter of the one or more center-shifted gas-flow passages at the second end portion is greater than a diameter of the one or more gas-flow passages at the central portion.

4. The cell according to claim 1, wherein
a gap between adjacent gas-flow passages of the plurality of gas-flow passages is larger at the first end portion than at the central portion.

5. A cell stack device comprising:
a cell stack comprising a plurality of the cells according to claim 1.

6. A module comprising:
a housing container; and
the cell stack device according to claim 5 housed in the housing container.

7. A module-containing device comprising:
the module according to claim 6;
an auxiliary device configured to operate the module; and
an external casing containing the module and the auxiliary device therein.

* * * * *